(12) United States Patent
Kim et al.

(10) Patent No.: US 12,379,443 B2
(45) Date of Patent: Aug. 5, 2025

(54) APPARATUS AND METHOD FOR ESTIMATING ANGLE OF ARRIVAL BASED ON ULTRA-WIDEBAND WIRELESS COMMUNICATION

(71) Applicant: INDUSTRY-ACADEMIC COOPERATION FOUNDATION, YONSEI UNIVERSITY, Seoul (KR)

(72) Inventors: Tae Wook Kim, Seoul (KR); Jun Young Jang, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 368 days.

(21) Appl. No.: 17/936,889

(22) Filed: Sep. 30, 2022

(65) Prior Publication Data

US 2023/0106857 A1  Apr. 6, 2023

(30) Foreign Application Priority Data

Oct. 1, 2021  (KR) .................. 10-2021-0130658

(51) Int. Cl.
*G01S 3/14* (2006.01)
*G01S 3/48* (2006.01)

(52) U.S. Cl.
CPC ............... *G01S 3/143* (2013.01); *G01S 3/48* (2013.01)

(58) Field of Classification Search
CPC .......... G01S 13/931; G01S 3/46; G01S 11/04; G01S 3/043; G01S 13/584; G01S 13/583; G01S 13/4454; G01S 13/325; G01S 13/343; G01S 7/40; G01S 7/352; G01S 7/2883; G01S 7/292; H04B 1/709; H04B 7/0413; H04B 7/086; H04B 7/04; H04B 7/0897

See application file for complete search history.

(56) References Cited

U.S. PATENT DOCUMENTS

| | | | |
|---|---|---|---|
| 9,791,564 B1 * | 10/2017 | Harris | G01S 13/931 |
| 2005/0113141 A1 * | 5/2005 | Felter | H04B 1/7103 |
| | | | 455/562.1 |

(Continued)

FOREIGN PATENT DOCUMENTS

| | | | | |
|---|---|---|---|---|
| EP | 1564899 A1 * | 8/2005 | ............. | H01Q 21/08 |
| JP | 2008-008887 A | 1/2008 | | |

(Continued)

*Primary Examiner* — Olumide Ajibade Akonai

(57) ABSTRACT

An apparatus for estimating an angle of arrival, comprises: a window setting unit for setting a window time that is a time interval for comparing a template signal and each of a plurality of reception signals obtained by receiving a transmission signal transmitted a pre-designated number of times; a template generator that generates a template signal of a waveform corresponding to the transmission signal, by adjusting a generation time point in units of the window time; a plurality of signal correlators provided corresponding to each of the plurality of antennas, and detecting a level of a correlation signal obtained by correlating a corresponding reception signal; and an angle of arrival determination unit, determining a reception time at which each of the plurality of reception signals is received by a corresponding antenna, and estimating the angle of arrival of the transmission signal using a difference between the determined reception times.

16 Claims, 8 Drawing Sheets

(56) References Cited

U.S. PATENT DOCUMENTS

| | | | | |
|---|---|---|---|---|
| 2005/0113142 A1* | 5/2005 | Felter | ............ | H04B 1/709 |
| | | | | 455/562.1 |
| 2009/0135954 A1* | 5/2009 | Salhov | ............ | H04B 7/086 |
| | | | | 375/317 |

FOREIGN PATENT DOCUMENTS

| | | | | |
|---|---|---|---|---|
| KR | 10-2012-0010632 A | 2/2012 | | |
| KR | 10-2013-0047221 A | 5/2013 | | |
| KR | 10-1750906 B1 | 7/2017 | | |
| KR | 10-2019-0065307 A | 6/2019 | | |
| WO | WO-2021032793 A1 * | 2/2021 | ......... | G01S 13/0209 |

\* cited by examiner

APPARATUS AND METHOD FOR ESTIMATING ANGLE OF ARRIVAL BASED ON ULTRA-WIDEBAND WIRELESS COMMUNICATION

CROSS-REFERENCE TO RELATED APPLICATIONS

This application claims priority under 35 U.S.C. § 119(a) to Korean Patent Application No. 10-2021-0130658, filed on Oct. 1, 2021, in the Korean Intellectual Property Office, the disclosure of which is incorporated herein in its entirety by reference.

BACKGROUND

1. Technical Field

The present disclosure relates to an apparatus and a method for estimating an angle of arrival, more particularly to an apparatus and a method for estimating an angle of arrival based on ultra-wideband wireless communication.

2. Description of the Related Art

Recently, as a short-distance communication method, a new ultra-wideband (hereinafter, UWB) impulse-based wireless communication method (802.15.4z, or 15.4z) is in the spotlight. This communication method supports not only data transmission but also detection of location information and distance between transceivers, however, for this, precise synchronization between transceivers and measurement of signal exchange time are required.

FIG. 1 shows an example of a distance measurement method in a conventional ultra-wideband wireless communication.

In FIG. 1, the distance between two communication devices (A, B) is measured. Here, a delay time ($T_{prop}$) of a communication signal is measured to determine the distance between the two communication devices (A, B). First, a first communication device (A) transmits a designated signal to a second communication device (B), and the second communication device (B) that has received the signal transmits the received signal back to the first communication device (A). Accordingly, the first communication device measures a round time ($T_{round}$) from the time when the signal is transmitted to the second communication device (B) to the time when the signal transmitted from the second communication device (B) is received.

As shown in FIG. 1, the round time ($T_{round}$) consists of the sum of the two transmission delay times ($T_{prop}$) from the first communication device (A) to the second communication device (B), and from the second communication device (B) back to the first communication device (A), and the response time ($T_{response}$) for the second communication device (B) to respond to the transmitted signal. Accordingly, if the round time ($T_{round}$) is measured, and the response time ($T_{response}$) of the second communication device (B) is known, the transmission delay time ($T_{prop}$) is easily calculated, and the distance between the two communication devices (A, B) can be determined from the calculated transmission delay time ($T_{prop}$). Based on the determined distance, at this time, in order to obtain the accurate response time ($T_{response}$), the two communication devices (A, B) must be synchronized, and since the signal has to make a round trip between the two communication devices (A, B), not only does the hardware burden increase, but it also becomes a factor making it difficult to implement a system according to a communication standard to satisfy various services.

SUMMARY

An object of the present disclosure is to provide an apparatus and a method for estimating an angle of arrival that can easily estimate the angle of arrival using a template signal.

Another object of the present disclosure is to provide an apparatus and a method for estimating an angle of arrival capable of determining a direction in which a transmitter is located with a simple hardware configuration.

An apparatus for estimating an angle of arrival according to an embodiment of the present disclosure, conceived to achieve the objectives above, comprises: a window setting unit for setting a window time that is a time interval for comparing a template signal and each of a plurality of reception signals obtained by receiving a transmission signal continuously transmitted a pre-designated number of times with a unit signal time length from a transmitter by each of a plurality of antennas disposed at a pre-designated interval; a template generator that continuously generates a template signal of a waveform corresponding to the transmission signal, by adjusting a generation time point in units of the window time; a plurality of signal correlators provided corresponding to each of the plurality of antennas, and detecting a level of a correlation signal obtained by correlating a corresponding reception signal among the plurality of reception signals and the template signal; and an angle of arrival determination unit, determining a reception time at which each of the plurality of reception signals is received by a corresponding antenna according to the level of each of the correlation signals detected in successive different window times, and estimating the angle of arrival of the transmission signal using a difference between the determined reception times.

The template generator may generate the template signal in a second window time with a delay from the template signal generated in a first window time among successive, the first window time and the second window time.

The template generator may generate the template signal in the second window time with a delay in a time range less than ½ of the unit signal time from the template signal generated in the first window time.

The angle of arrival determination unit may use a lookup table in which a relationship between a reception time and a level of a first correlation signal, which is a correlation signal obtained at a first window time among successive first and second window times, is stored in advance, to obtain two candidate times for a reception time at which the reception signal is received at a corresponding antenna, and compare the level of the first correlation signal and a level of a second correlation signal, which is a correlation signal obtained at the second window time, thereby selecting one of the two candidate times as a reception time.

The angle of arrival determination unit, when the level of the second correlation signal is lower than the level of the first correlation signal, may determine the later of the two candidate times as the reception time, and when the level of the second correlation signal is higher than the level of the first correlation signal, may determine the earlier of the two candidate times as the reception time.

The angle of arrival determination unit may calculate a slope distance representing a distance difference at which the transmission signal is received by each of the plurality of antennas by an angle of arrival and an interval between the plurality of antennas based on a reception time difference between reception signals received by each of the plurality of antennas, and calculate the angle of arrival based on the slope distance and the interval between the plurality of antennas.

The window setting unit may set the window time as the sum of a burst time during which the transmission signal is continuously transmitted a pre-designated number of times from the transmitter and a guard interval having the same time length as the burst time and in which a transmission signal is not transmitted.

Each of the plurality of signal correlators may include: a signal synthesizer outputting a synthesized signal by synthesizing the reception signal received by a corresponding one of the plurality of antennas and the template signal; an integrator for accumulating the synthesized signal for a unit signal time to obtain the correlation signal; and a digital converter that converts a level of the correlation signal to digital and outputs it.

A method for estimating an angle of arrival according to another embodiment of the present disclosure, conceived to achieve the objectives above, comprises the steps of: setting a window time that is a time interval for comparing a template signal and each of a plurality of reception signals obtained by receiving a transmission signal continuously transmitted a pre-designated number of times with a unit signal time length from a transmitter by each of a plurality of antennas disposed at a pre-designated interval; continuously generating a template signal of a waveform corresponding to the transmission signal, by adjusting a generation time point in units of the window time; detecting levels of a plurality of correlation signals obtained by correlating each of the plurality of reception signals received through the plurality of antennas and the template signal; and determining a reception time at which each of the plurality of reception signals is received by a corresponding antenna according to the level of each of the correlation signals detected in successive different window times, and estimating the angle of arrival of the transmission signal using a difference between the determined reception times.

Accordingly, the apparatus and method for estimating an angle of arrival according to an embodiment of the present disclosure can detect a delay time difference between reception signals received by each of a plurality of antennas using a pre-designated template signal, and accurately detect an angle of arrival of a signal transmitted from a transmitter based on the delay time difference of the detected reception signals with a simple hardware configuration.

DETAILED DESCRIPTION

Figure 1:
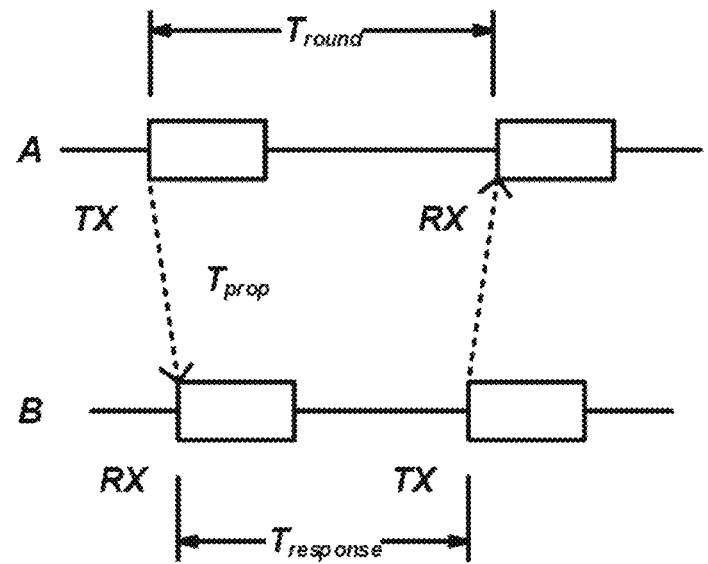
FIG. 1 shows an example of a distance measurement method in a conventional ultra-wideband wireless communication.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
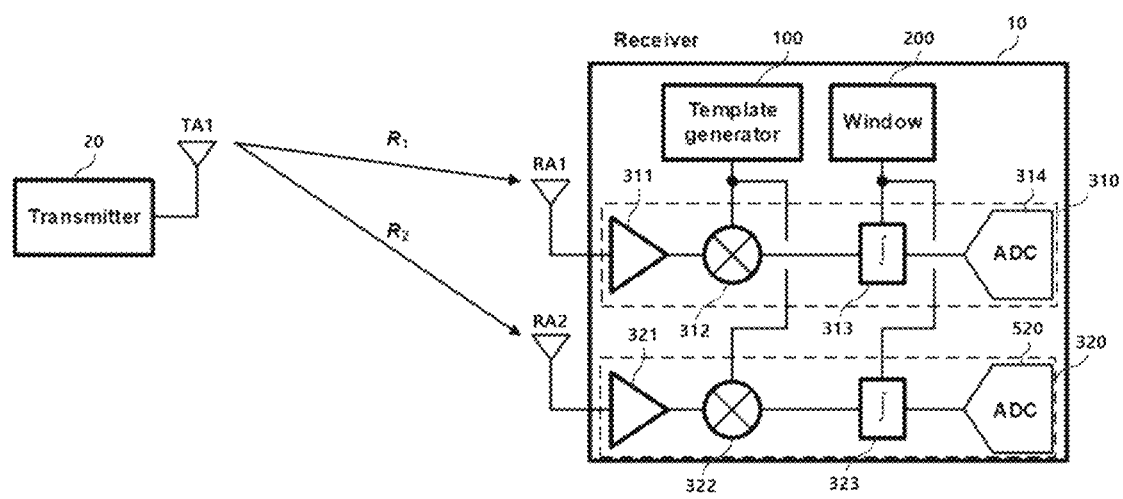
FIG. 2 shows a schematic configuration of an apparatus for estimating an angle of arrival according to an embodiment of the present disclosure.
Figure 3:
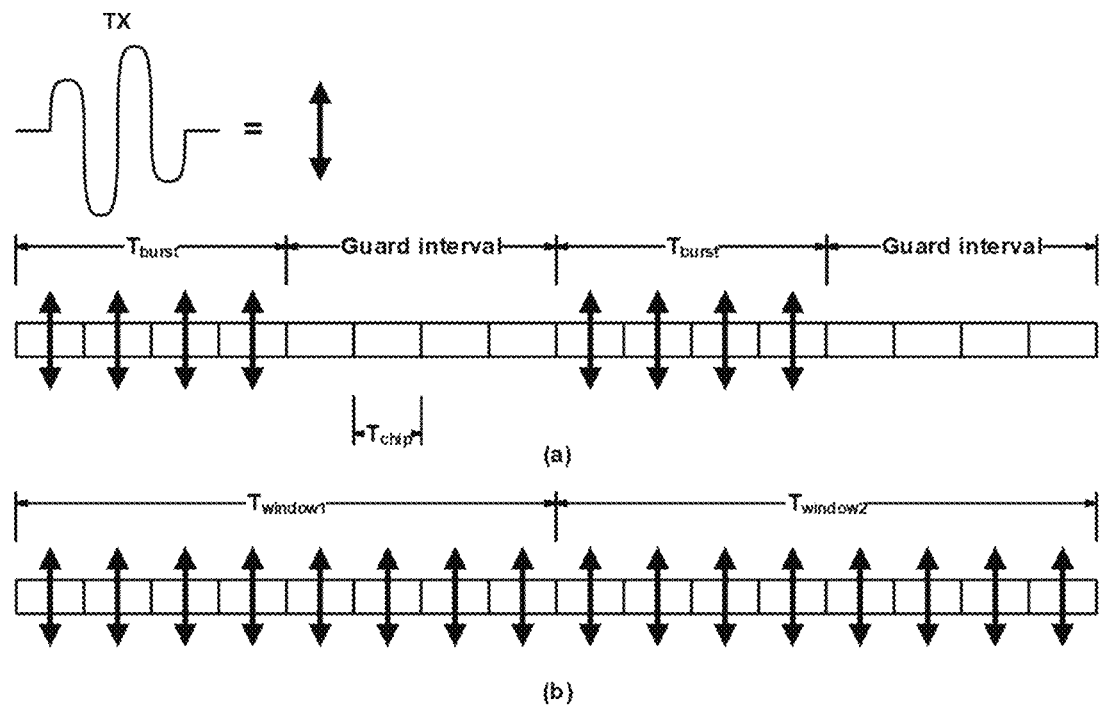
FIG. 3 shows an example of a transmission signal transmitted according to a communication standard in the transmitter of FIG. 2.
Figure 4:
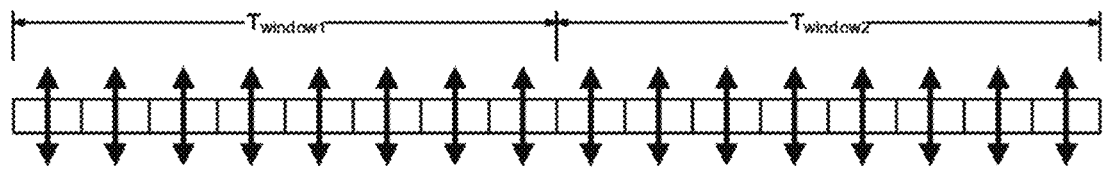
FIG. 4 shows an example of a template signal generated by the receiver of FIG. 2.

FIG. 2 shows a schematic configuration of an apparatus for estimating an angle of arrival according to an embodiment of the present disclosure, FIG. 3 shows an example of a transmission signal transmitted according to a communication standard in the transmitter of FIG. 2, and FIG. 4 shows an example of a template signal generated by the receiver of FIG. 2.

Referring to FIG. 2, the apparatus for estimating an angle of arrival according to the present embodiment may be included in the receiver 10 in the communication apparatus of the ultra-wideband wireless communication system. Here, the transmitter 20 and the receiver 10 are separately described for convenience of explanation, but each of the communication devices of the ultra-wideband wireless communication system may be implemented as a transceiver in which the transmitter and the receiver are integrated.

As shown in FIG. 3, the transmitter 20 generates a transmission signal of a pre-designated waveform and transmits it to the receiver 10. In the present embodiment, it is assumed that the transmitter 20 generates and transmits a transmission signal designated by the 802.15.4z communication standard, and for convenience of understanding, the transmission signal of the corresponding frequency band is briefly indicated by an arrow. The transmitter 20 continuously transmits a pre-designated transmission signal a designated number of times, then stops transmitting the transmission signal for the same amount of time, and then repeats the process of transmitting the transmission signal again a pre-designated number of times.

When a time length of one transmission signal is called a unit signal time ($T_{chip}$), the burst time ($T_{burst}$) indicating the length of time during which the transmitter 20 continuously transmits the designated number of transmission signals can be expressed as a multiple of the unit signal time ($T_{chip}$). In FIG. 3, since the transmitter 20 continuously transmits four signals, the burst time ($T_{burst}$) is four times the unit signal time ($T_{chip}$)) ($T_{burst}=4\times T_{chip}$). In addition, the time interval for stopping signal transmission is called a guard interval, and is set to a time interval having the same length as the burst time ($T_{burst}$).

Therefore, in the case of FIG. 3, the transmitter 20 continuously transmits four transmission signals for a burst time ($T_{burst}$), then stops transmitting the transmission signal during the guard interval, which is a time interval of the same length as the burst time ($T_{burst}$), and then repeats the process of continuously transmitting four transmission signals for a burst time ($T_{burst}$) again.

Meanwhile, in the present embodiment, the receiver 10 includes a plurality of antennas (RA1, RA2). That is, the receiver 10 includes an array antenna in which the plurality of antennas (RA1, RA2) are disposed to be spaced apart from each other according to a pre-designated pattern. Here, as a simple example, the receiver 10 is illustrated as having only two antennas (RA1, RA2), but the receiver 10 may include two or more plurality of antennas, and the plurality of antennas may be disposed to be spaced apart from each other by a pre-designated interval.

In addition, the receiver 10 according to the present embodiment may include a template generator 100, a window setting unit 200 and a plurality of signal correlators 310 and 320.

The template generator 100 generates and outputs a template signal of a waveform corresponding to the transmission signal generated by the transmitter 20. Here, since the transmission signal is a signal of a pre-designated waveform, the template generator 100 may generate a template signal having the same waveform as the transmission signal. In the present embodiment, as shown in FIG. 4, the template generator 100 may continuously and repeatedly generate a template signal at an interval of a unit signal time ($T_{chip}$), and may adjust the generation time of the template signal with a delay.

The window setting unit 200 sets a window for comparing the reception signal transmitted from the transmitter 20 and received by each of the plurality of antennas (RA1, RA2) with the template signal generated by the template generator 100. Here, the window time ($T_{window}$) may be set to have a window time ($T_{window}$) of a length corresponding to the sum of the burst time ($T_{burst}$) and the guard interval. As described above, since the guard interval has the same length as the burst time ($T_{burst}$), the window time ($T_{window}$) may be regarded as being set to be twice the length of the burst time ($T_{burst}$).

Each of the plurality of signal correlators 310 and 320 calculates a delay time difference between reception signals by comparing a reception signal received through a corresponding one of the plurality of antennas (RA1, RA2) with a template signal in a pre-designated manner.

The plurality of signal correlators 310 and 320 may include amplifiers 311 and 321, signal synthesizers 312 and 322, integrators 313 and 323, and digital converters 314 and 520, respectively.

The amplifiers 311 and 321 amplify and output the reception signal received through a corresponding antenna among the plurality of antennas (RA1, RA2), and the signal synthesizers 312 and 322 synthesize and output the reception signal amplified by the amplifiers 311 and 321 and the template signal generated by the template generator 100. In addition, the integrators 313 and 323 integrate the synthesis signals output from the signal synthesizers 312 and 322 for a unit signal time ($T_{chip}$) to output a correlation signal. Here, the correlation signal may be output in the form of a voltage level according to a correlation result between the reception signal and the template signal.

The digital converters 314 and 520 convert the level of the correlation signal into digital data and output it.

Although not shown, the apparatus for estimating an angle of arrival of the present embodiment further includes an angle of arrival determination unit that calculates a delay time difference of a reception signal received by each antenna based on the correlation data obtained from each of the plurality of signal correlators 310 and 320 and determines an angle of arrival from the calculated delay time difference.

Figure 5:
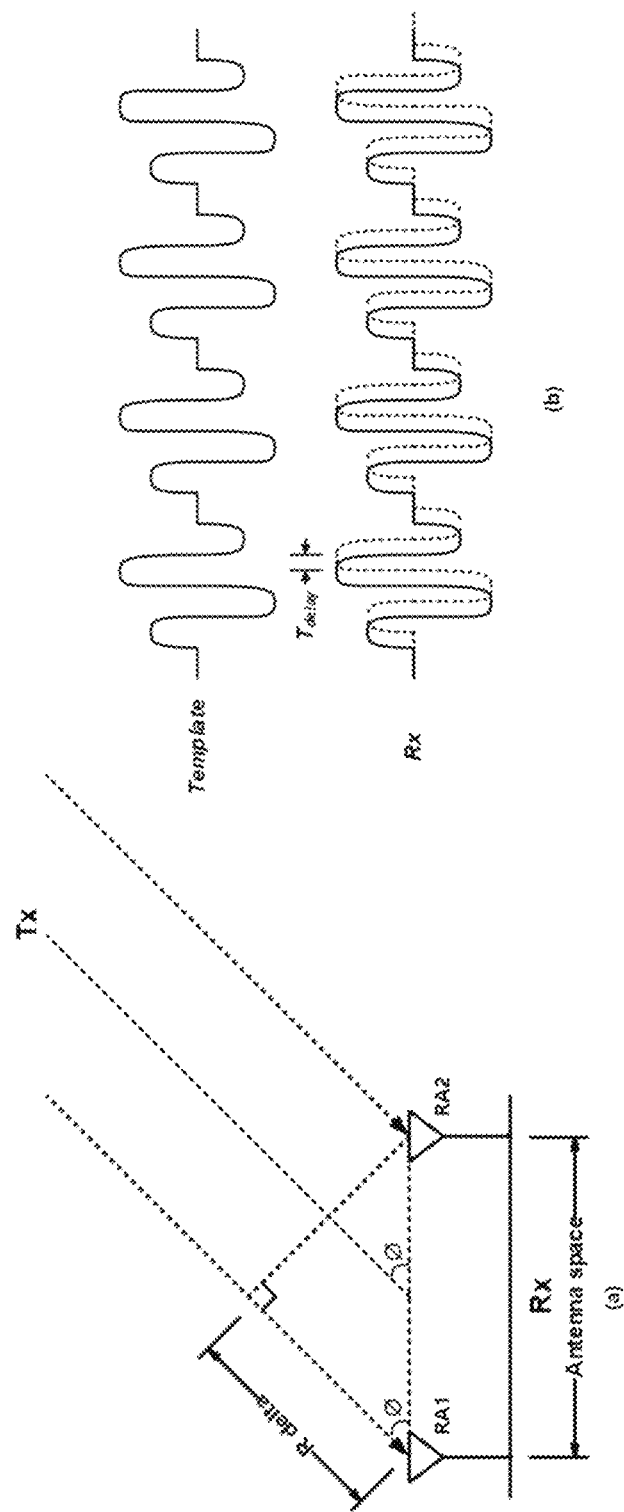
FIG. 5 is a diagram for explaining a delay time difference of a reception signal according to a reception angle.

FIG. 5 is a diagram for explaining a delay time difference of a reception signal according to a reception angle.

As shown in FIG. 5 (a), when two antennas (RA1, RA2) are disposed to be spaced apart from each other by a pre-designated space, and a transmission signal (Tx) is incident in the direction of the angle ($\Phi$), a time difference occurs for the time point when the transmission signal (Tx) arrives at each antenna (RA1, RA2) due to an antenna space of the two antennas (RA1, RA2), and as a result, as shown in FIG. 5 (b), a delay time difference ($T_{delay}$) occurs also between the reception signals (Rx) received by the respective antennas (RA1, RA2). Accordingly, when the delay time difference ($T_{delay}$) is measured, the slope distance (R delta) can be calculated from the measured delay time difference ($T_{delay}$), and if the slope distance (R delta) and the antenna space of the two antennas (RA1, RA2) are known, the angle of arrival ($\Phi$) at which the transmission signal (Tx) is incident can be easily calculated.

In addition, the delay time difference ($T_{delay}$) between the reception signals (Rx) received by the two antennas (RA1, RA2) can be measured by correlating using a template signal.

Figure 6:
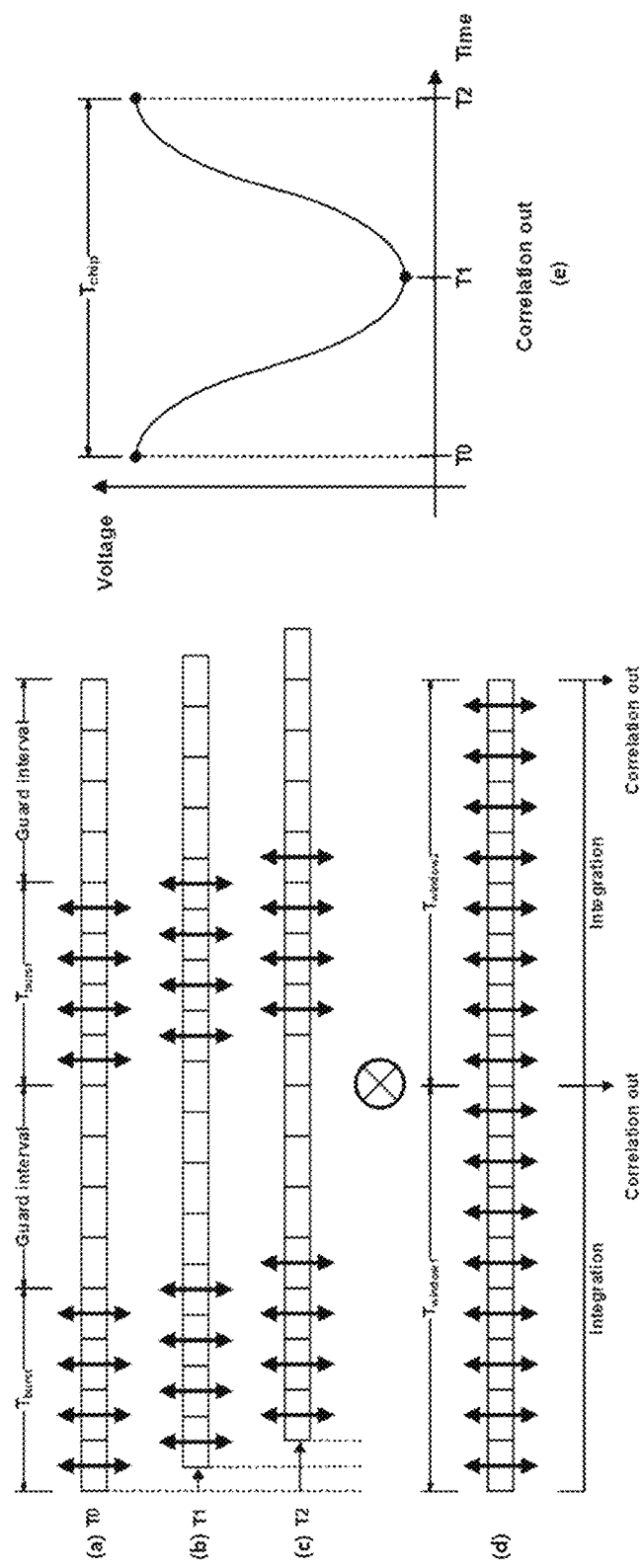
FIG. 6 is a diagram for explaining a correlation between a reception signal and a template signal.

FIG. 6 is a diagram for explaining a correlation between a reception signal and a template signal.

In FIG. 6, (a) to (c) show reception signals (Rx) received by the antenna of the receiver 10 at different times, (d) shows a template signal generated by the template generator 100, and (e) shows the correlation result between the reception signal (Rx) and the template signal.

Comparing the reception signals (Rx) of FIG. 6 (a) to (c) with the template signal of FIG. 6 (d), (a) shows a case where the phases of the reception signal (Rx) received by the antenna and the template signal coincide, (b) shows a case where the phases of the reception signal (Rx) and the template signal is 180 degrees different, and (c) shows a case in which the reception signal (Rx) and the template signal have a time difference as much as the unit signal time ($T_{chip}$), so that the phases coincide again.

Accordingly, the correlation signal obtained by synthesizing the template signal and the reception signal (Rx) received at different times during the unit signal time ($T_{chip}$) from FIG. 6 (a) to FIG. 6 (c) is shown as FIG. 6 (e).

That is, the correlation result between the reception signal (Rx) and the template signal is highest when the phases of the reception signal (Rx) and the template signal is the same, it becomes lower as the phases are different from each other, and becomes higher again after the 180 degree phase difference occurs.

Accordingly, using a lookup table or the like in which the relationship between the reception time of the reception signal and the voltage level of the correlation signal is stored in advance, it is possible to detect the time at which the reception signal is received within the unit signal time ($T_{chip}$).

Although, when the reception signal (Rx) is received with a delay of more than the unit signal time ($T_{chip}$), the level of the correlation signal appears again and again in the same way, in this case, since a size of the window is set to the window time ($T_{window}$) corresponding to the sum of the burst time ($T_{burst}$) and the guard interval, it is possible to easily detect a unit signal time ($T_{chip}$) interval corresponding to the reception signal (Rx) received in the window by the guard interval.

Accordingly, the angle of arrival determination unit can detect the time at which the reception signal is received by using the correlation between the reception signal (Rx) and the template signal, and the slope distance (R delta) can be easily calculated based on the reception time difference at each of the antennas (RA1, RA2). Referring to FIG. 5 (a), the slope distance (R delta) can be calculated by multiplying the speed of light (c) by the difference (T1-T2) between the time (T1) when the reception signal (Rx) is received by the first antenna (RA1) and the time (T2) when the reception signal (Rx) is received by the second antenna (RA2).

Figure 7:
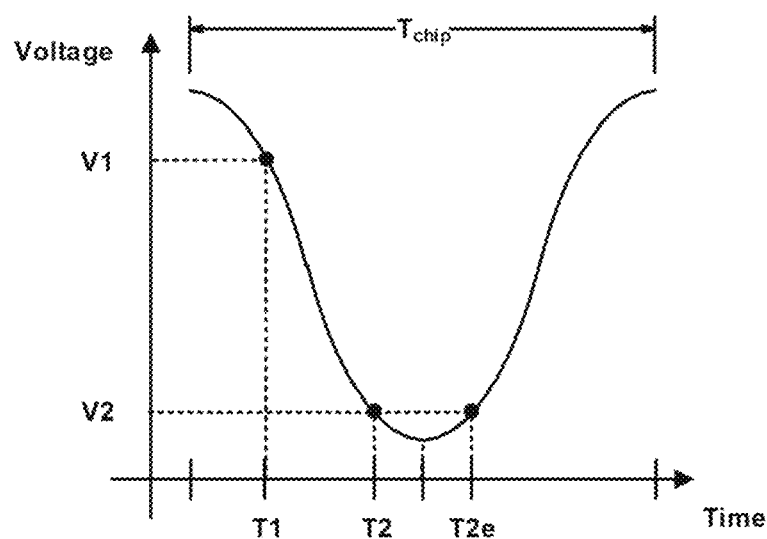
FIG. 7 is a diagram for explaining a problem of delay time measurement according to the correlation result of FIG. 5.

FIG. 7 is a diagram for explaining a problem of delay time measurement according to the correlation result of FIG. 5.

In FIG. 6, it has been described that the time when the reception signal (Rx) is received by a corresponding antenna can be accurately detected according to the voltage level of the correlation signal which is a correlation result between the reception signal and the template signal. However, as shown in FIG. 7, since the voltage level of the correlation signal is symmetrical on both sides based on the case where the phase difference between the reception signal and the template signal is 180 degrees, there is a problem in that even when the voltage levels (V1, V2) of the correlation signal for the reception signal received from each of the two antennas (RA1, RA2) are obtained, it is difficult to accurately determine the delay time of the reception signal (Rx) with respect to the template signal.

That is, when the voltage level (V2) of the correlation signal between the reception signal received by the second antenna (RA2) and the template signal is obtained, there are two times, T2 and T2e, corresponding to the corresponding voltage level (V2). Accordingly, it is not possible to determine which time of T2 and T2e is the time at which the reception signal (Rx) is received.

Figure 8:
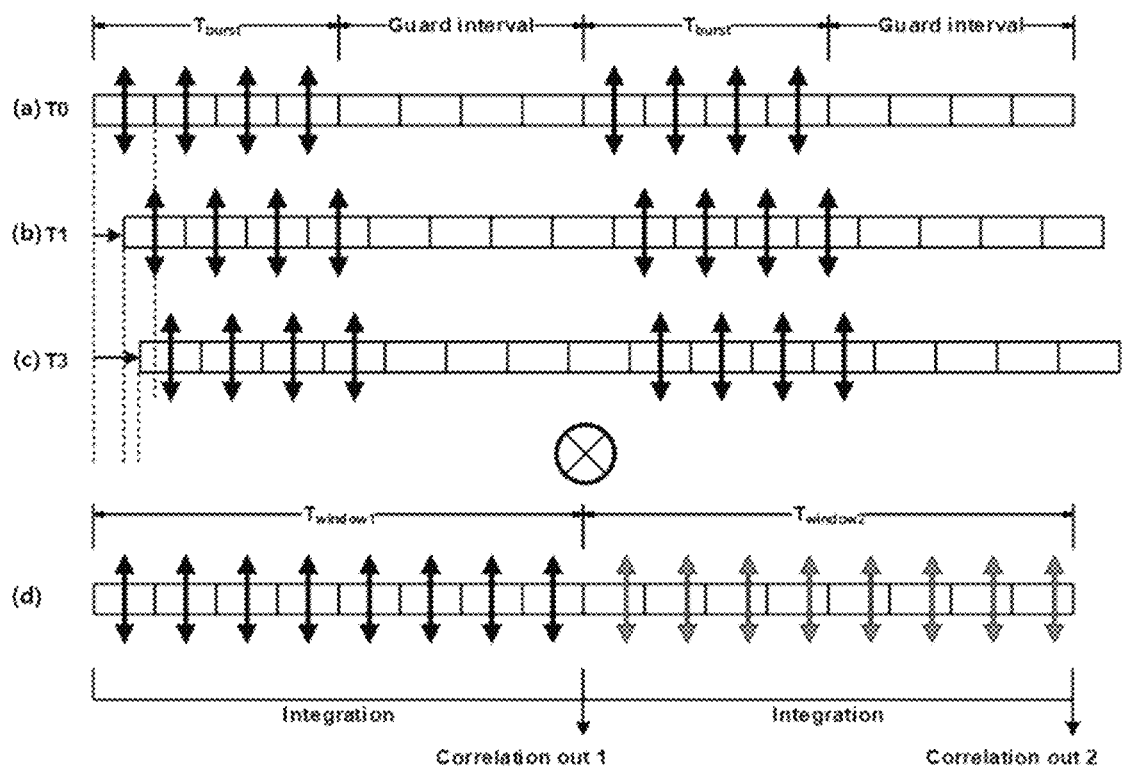
FIGS. 8 and 9 are diagrams for explaining a correlation between a reception signal and a template signal generated according to the present embodiment.
Figure 9:
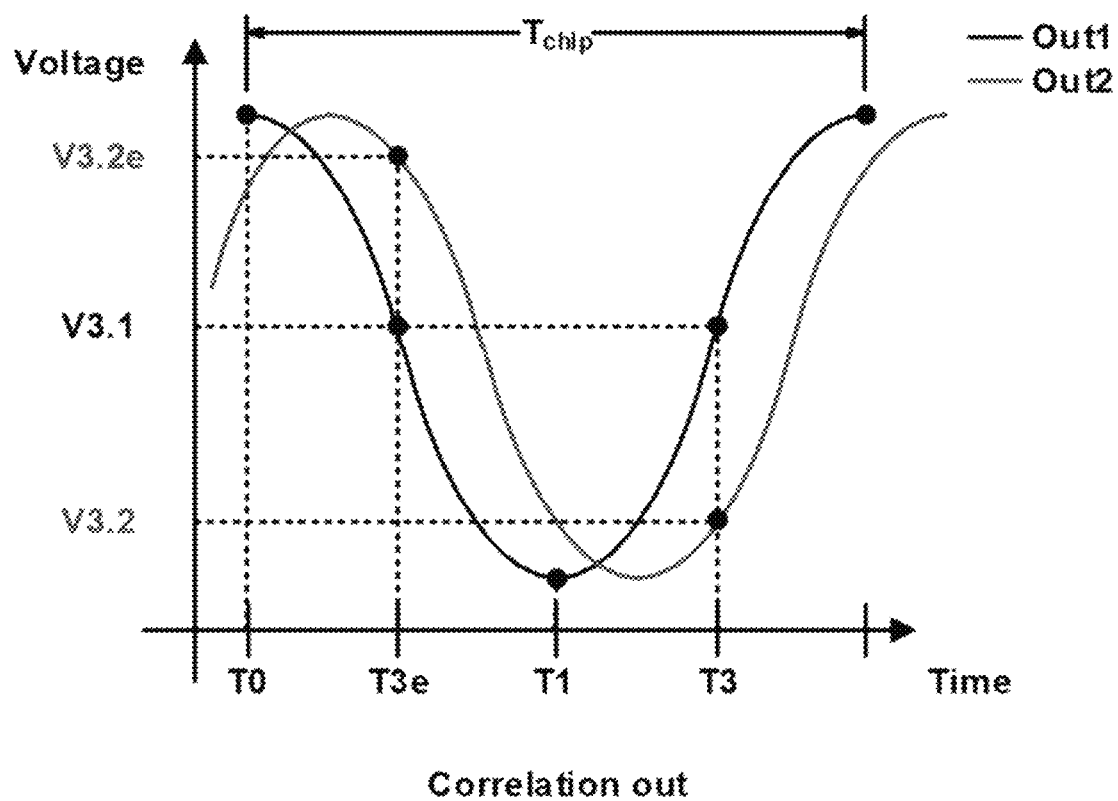

FIGS. 8 and 9 are diagrams for explaining a correlation between a reception signal and a template signal generated according to the present embodiment.

In order to solve the problem of FIG. 7, in the present embodiment, the template generator 100 generates and outputs at different times depending on the window times ($T_{window1}$, $T_{window2}$), as shown in FIG. 8. In FIG. 8, the template generator 100 generates and outputs the template signal at the same time as in FIG. 5 during the first window time ($T_{window1}$), whereas it delays the output by a pre-designated time interval during the second window time ($T_{window2}$). Here, the template signal in the second window time ($T_{window2}$) should be generated with a delay within a time range smaller than $\frac{1}{2}(T_{chip}/2)$ of the unit signal time ($T_{chip}$).

Accordingly, even when correlation is performed with the template signal for the same reception signal (Rx), the correlation signal is appeared differently in the first window and in the second window, as shown in FIG. 9.

As shown in FIG. 9, when the level of the correlation signal in the first window appears as V3.1, the time at which the reception signal (Rx) is received is one of T3 and T3e, and it cannot be distinguished in the first window. Accordingly, the level of the correlation signal with respect to the reception signal is checked in the second window. When the level of the correlation signal in the second window appears as V3.2, that is, when the level (V3.2) of the correlation signal in the second window is lower than the level (V3.1) of the correlation signal in the first window (V3.1>V3.2), the angle of arrival determination unit may determine the time at which the reception signal (Rx) is received as T3. On the other hand, when the level of the correlation signal in the second window appears as V3.2e, that is, when the level (V3.2e) of the correlation signal in the second window is higher than the level (V3.1) of the correlation signal in the first window (V3.1<V3.2e), the angle of arrival determination unit may determine the time at which the reception signal (Rx) is received as T3e.

In addition, the angle of arrival determination unit may calculate the slope distance (R delta) according to the difference in the reception time of the reception signal (Rx) determined for each antenna (RA1, RA2), and may accurately determine the angle of arrival according to the calculated slope distance (R delta) and the arrangement positions of the first and second antennas (RA1, RA2).

As a result, the apparatus for estimating an angle of arrival according to the present embodiment can easily estimate the angle of arrival by generating the template signal with delay at different time points depending on the window and correlating it with the reception signal to detect the level of the correlation signal.

Figure 10:
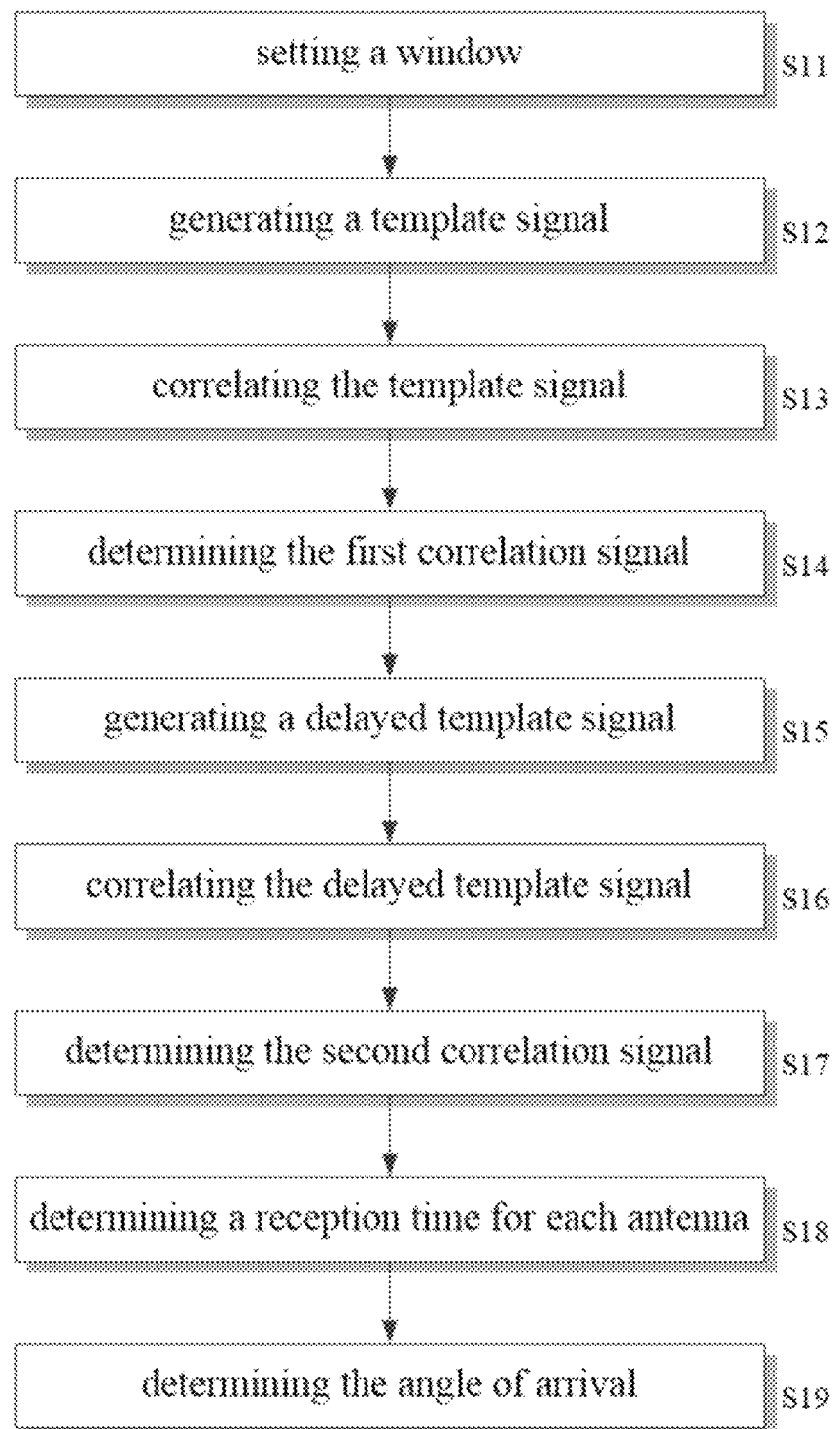
FIG. 10 shows a method for estimating an angle of arrival according to an embodiment of the present disclosure.

FIG. 10 shows a method for estimating an angle of arrival according to an embodiment of the present disclosure.

Describing the method for estimating an angle of arrival according to present embodiment with reference to FIGS. 2 to 9, the apparatus for estimating an angle of arrival first sets a size of a window, that is, a window time ($T_{window}$), indicating an interval for correlating a reception signal (Rx) and a template signal (S11). Here, the window time ($T_{window}$) is set to a size corresponding to the sum of a burst time ($T_{burst}$) for which the transmitter 20 transmits a transmission signal (Tx) a pre-designated number of times according to a unit signal time ($T_{chip}$) indicating a time length of a signal transmitted by the transmitter 20 and a guard interval in which the transmitter 20 stops transmitting the transmission signal for the same time as the burst time.

When the window time ($T_{window}$) is set, a template signal of a waveform corresponding to the transmission signal (Tx) is repeatedly generated for the first window time ($T_{window1}$) (S12). Then, a first correlation signal is obtained by correlating the template signal generated during the first window time ($T_{window1}$) and the reception signal (Rx) received by the corresponding antenna among the plurality of antennas (RA1, RA2) (S13). When the first correlation signal is obtained, the level of the obtained first correlation signal is determined (S14).

During the second window time ($T_{window2}$) after the first window time ($T_{window1}$), the template signal is generated with a delay within a time range smaller than $\frac{1}{2}(T_{chip}/2)$ of the unit signal time ($T_{chip}$) compared to the first window time ($T_{window1}$) (S15). A second correlation signal is obtained by correlating the delayed template signal generated with a delay for the second window time ($T_{window2}$) and the reception signal (Rx) received by the corresponding antenna among the plurality of antennas (RA1, RA2) (S16). When the second correlation signal is obtained, the level of the obtained second correlation signal is determined (S17).

When the levels of the first and second correlation signals are determined, a reception time at which the reception signal (Rx) is received by each of the antennas (RA1, RA2) is determined according to the level of the first correlation signal obtained for each antenna (RA1, RA2) and the relationship between the levels of the first and second correlation signals (S18).

Here, first, the level of the first correlation signal obtained for each antenna (RA1, RA2) is input to a lookup table in which the relationship between the level of the correlation signal and the reception time is stored in advance, so that two candidate times for the reception times at which the reception signal (Rx) is received by each of the antennas (RA1, RA2) can be obtained. Then, when the level of the second correlation signal is lower than the level of the first correlation signal, the later of the two candidate times is determined as the reception time, and when the level of the second correlation signal is higher than the level of the first correlation signal, the earlier time is determined as the reception time.

Meanwhile, when the reception time for each of the plurality of antennas (RA1, RA2) is determined, the slope distance (R delta) is calculated according to the determined reception time, and the angle of arrival (Φ) is estimated using the triangulation technique based on the calculated slope distance (R delta) and the antenna space of the plurality of antennas (RA1, RA2) (S19).

A method according to the present disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM(random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. An apparatus for estimating an angle of arrival provided in a receiver of a ultra-wideband wireless communication system, comprising:
    a window setting unit for setting a window time that is a time interval for comparing a template signal and each of a plurality of reception signals obtained by receiving a transmission signal continuously transmitted a pre-designated number of times with a unit signal time length from a transmitter by each of a plurality of antennas disposed at a pre-designated interval;
    a template generator that continuously generates a template signal of a waveform corresponding to the transmission signal, by adjusting a generation time point in units of the window time;
    a plurality of signal correlators provided corresponding to each of the plurality of antennas, and detecting a level of a correlation signal obtained by correlating a corresponding reception signal among the plurality of reception signals and the template signal; and
    an angle of arrival determination unit, determining a reception time at which each of the plurality of reception signals is received by a corresponding antenna according to the level of each of the correlation signals detected in successive different window times, and estimating the angle of arrival of the transmission signal using a difference between the determined reception times.

2. The apparatus for estimating an angle of arrival according to claim 1,
    wherein the template generator generates the template signal in a second window time with a delay from the template signal generated in a first window time among successive, the first window time and the second window time.

3. The apparatus for estimating an angle of arrival according to claim 2,
    wherein the template generator generates the template signal in the second window time with a delay in a time range less than ½ of the unit signal time from the template signal generated in the first window time.

4. The apparatus for estimating an angle of arrival according to claim 2,
    wherein the angle of arrival determination unit uses a lookup table in which a relationship between a reception time and a level of a first correlation signal, which is a correlation signal obtained at a first window time among successive first and second window times, is stored in advance, to obtain two candidate times for a reception time at which the reception signal is received at a corresponding antenna, and compares the level of the first correlation signal and a level of a second correlation signal, which is a correlation signal obtained at the second window time, thereby selecting one of the two candidate times as a reception time.

5. The apparatus for estimating an angle of arrival according to claim 4,
    wherein the angle of arrival determination unit, when the level of the second correlation signal is lower than the level of the first correlation signal, determines the later of the two candidate times as the reception time, and when the level of the second correlation signal is higher than the level of the first correlation signal, determines the earlier of the two candidate times as the reception time.

6. The apparatus for estimating an angle of arrival according to claim 4,
    wherein the angle of arrival determination unit calculates a slope distance representing a distance difference at which the transmission signal is received by each of the plurality of antennas by an angle of arrival and an interval between the plurality of antennas based on a reception time difference between reception signals received by each of the plurality of antennas, and calculates the angle of arrival based on the slope distance and the interval between the plurality of antennas.

7. The apparatus for estimating an angle of arrival according to claim 1,
    wherein the window setting unit sets the window time as the sum of a burst time during which the transmission signal is continuously transmitted a pre-designated number of times from the transmitter and a guard interval having the same time length as the burst time and in which a transmission signal is not transmitted.

8. The apparatus for estimating an angle of arrival according to claim 1,
wherein each of the plurality of signal correlators includes:
a signal synthesizer outputting a synthesized signal by synthesizing the reception signal received by a corresponding one of the plurality of antennas and the template signal;
an integrator for accumulating the synthesized signal for a unit signal time to obtain the correlation signal; and
a digital converter that converts a level of the correlation signal to digital and outputs it.

9. A method for estimating an angle of arrival of an apparatus for estimating an angle of arrival provided in a receiver of a ultra-wideband wireless communication system, comprising the steps of:
setting a window time that is a time interval for comparing a template signal and each of a plurality of reception signals obtained by receiving a transmission signal continuously transmitted a pre-designated number of times with a unit signal time length from a transmitter by each of a plurality of antennas disposed at a pre-designated interval;
continuously generating a template signal of a waveform corresponding to the transmission signal, by adjusting a generation time point in units of the window time;
detecting levels of a plurality of correlation signals obtained by correlating each of the plurality of reception signals received through the plurality of antennas and the template signal; and
determining a reception time at which each of the plurality of reception signals is received by a corresponding antenna according to the level of each of the correlation signals detected in successive different window times, and estimating the angle of arrival of the transmission signal using a difference between the determined reception times.

10. The method for estimating an angle of arrival according to claim 9,
wherein the step of generating a template signal generates the template signal in a second window time with a delay from the template signal generated in a first window time among successive, the first window time and the second window time.

11. The method for estimating an angle of arrival according to claim 10,
wherein the step of generating a template signal generates the template signal in the second window time with a delay in a time range less than ½ of the unit signal time from the template signal generated in the first window time.

12. The method for estimating an angle of arrival according to claim 10,
wherein the step of estimating the angle of arrival includes the steps of:
using a lookup table in which a relationship between a reception time and a level of a first correlation signal, which is a correlation signal obtained at a first window time among successive first and second window times, is stored in advance, to obtain two candidate times for a reception time at which the reception signal is received at a corresponding antenna, and comparing the level of the first correlation signal and a level of a second correlation signal, which is a correlation signal obtained at the second window time, thereby selecting one of the two candidate times as a reception time; and
determining the angle of arrival based on a time difference between reception times selected for each of the plurality of antennas and an interval between the plurality of antennas.

13. The method for estimating an angle of arrival according to claim 12,
wherein the step of selecting as a reception time, when the level of the second correlation signal is lower than the level of the first correlation signal, determines the later of the two candidate times as the reception time, and when the level of the second correlation signal is higher than the level of the first correlation signal, determines the earlier of the two candidate times as the reception time.

14. The method for estimating an angle of arrival according to claim 12,
wherein the step of determining the angle of arrival includes the steps of:
calculating a slope distance representing a distance difference at which the transmission signal is received by each of the plurality of antennas by an angle of arrival and an interval between the plurality of antennas based on a reception time difference between reception signals received by each of the plurality of antennas; and
calculating the angle of arrival based on the slope distance and the interval between the plurality of antennas.

15. The method for estimating an angle of arrival according to claim 9,
wherein the step of setting a window time sets the window time as the sum of a burst time during which the transmission signal is continuously transmitted a pre-designated number of times from the transmitter and a guard interval having the same time length as the burst time and in which a transmission signal is not transmitted.

16. The method for estimating an angle of arrival according to claim 9,
wherein the step of detecting levels of a plurality of correlation signals includes the steps of:
outputting a synthesized signal by synthesizing the reception signal received by a corresponding one of the plurality of antennas and the template signal;
accumulating the synthesized signal for a unit signal time to obtain the correlation signal; and
converting a level of the correlation signal to digital and outputting it.

* * * * *